United States Patent
Seo (10) Patent No.: US 7,715,566 B2
(45) Date of Patent: May 11, 2010

(54) APPARATUS AND METHOD OF AUTOMATICALLY COMPENSATING A DIFFERENCE BETWEEN AUDIO SIGNALS OF AN ANALOG BROADCAST AND A DIGITAL BROADCAST

(75) Inventor: Young-joo Seo, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1441 days.

(21) Appl. No.: 11/094,450

(22) Filed: Mar. 31, 2005

(65) Prior Publication Data

US 2005/0277393 A1 Dec. 15, 2005

(30) Foreign Application Priority Data

Jun. 10, 2004 (KR) ...................... 10-2004-0042569

(51) Int. Cl.
*H04H 20/47* (2008.01)
*H04N 5/50* (2006.01)
(52) U.S. Cl. .................... 381/2; 381/16; 381/6; 381/7; 348/731; 455/132; 455/234.1
(58) Field of Classification Search ............... 381/2–17, 381/123; 455/132, 133, 136, 138, 232.1, 455/234.1; 370/468; 348/731
See application file for complete search history.

(56) References Cited

U.S. PATENT DOCUMENTS 5,325,188 A 6/1994 Scarpa
6,148,008 A * 11/2000 Okamoto .................... 370/486
6,437,604 B1 * 8/2002 Forbes ......................... 326/98
6,437,837 B1 * 8/2002 Seo ............................. 348/735
6,473,604 B1 * 10/2002 Hinkle et al. ............. 455/232.1
6,714,600 B1 * 3/2004 Okanobu .................... 375/316
2002/0115418 A1 * 8/2002 Wildhagen .................. 455/133

FOREIGN PATENT DOCUMENTS

| JP | 2001-320646 | * 11/2001 |
| JP | 2003-169270 |   6/2003 |
| KR | 1019970025682 |   6/1997 |
| KR | 1019970080781 |  12/1997 |

* cited by examiner

*Primary Examiner*—Xu Mei
(74) *Attorney, Agent, or Firm*—Stanzione & Kim LLP (57) ABSTRACT

An apparatus and a method of automatically compensating a difference between audio signals of an analog broadcast and a digital broadcast depending on a difference of a modulation degree of an analog audio signal and a digital audio signal. The apparatus includes an analog demodulating unit to demodulate an analog audio signal of a tuned analog broadcast channel, a digital demodulating unit to demodulate a digital audio signal of a tuned digital broadcast channel, a switching unit to receive the audio signals from the analog demodulating unit and the digital demodulating unit and to selectively output the received audio signals, an audio amplifying unit to amplify the audio signals output from the switching unit at a predetermined amplification degree, and a central processing unit to control the switching unit to output the audio signal of the digital demodulating unit and to control an amplification degree of the audio amplifying unit as the digital broadcast channel is tuned by a user, to allow the output audio signal of the digital broadcast channel to have the same magnitude as when the corresponding analog broadcast channel is tuned.

25 Claims, 3 Drawing Sheets

| DIGITAL BROADCASTING CHANNEL | OFFSET FOR CONTROLLING AUDIO AMPLIFYING UNIT |
|---|---|
| 14 | 2 |
| 15 | 1.5 |
| 16 | 2 |
| 17 | 2 |
| 18 | 4 |

FIG. 3

APPARATUS AND METHOD OF AUTOMATICALLY COMPENSATING A DIFFERENCE BETWEEN AUDIO SIGNALS OF AN ANALOG BROADCAST AND A DIGITAL BROADCAST

CROSS-REFERENCE TO RELATED APPLICATIONS

This application claims the benefit under 35 U.S.C. § 119(a) from Korean Patent Application No. 2004-42569 filed on Jun. 10, 2004 with the Korean Intellectual Property Office, the disclosure of which is incorporated herein in its entirety by reference.

BACKGROUND OF THE INVENTION

1. Field of the Invention

The present general inventive concept relates to an apparatus and a method of automatically compensating a difference between audio signals of an analog broadcast and a digital broadcast in which a magnitude of output audio signals of a simulcast that depend on a difference between modulation degrees thereof.

2. Description of the Related Art

Digital broadcasting began in 1998, but analog broadcasting is still being used. Simulcast is used to concurrently broadcast the same contents over a digital broadcast channel and an analog broadcast channel. According to the simulcast, even though the digital broadcast is received, a user can still use an analog television set to view the contents of the analog broadcast. Accordingly, a digital broadcast receiver has been developed for concurrently receiving the analog broadcast and the digital broadcast. Therefore, the same contents are concurrently transmitted over the analog broadcast channel and the digital broadcast channel for the same station, and the user can use the digital broadcast receiver to tune to a predetermined channel and view the contents over the tuned channel.

In a conventional analog broadcast, an audio signal of the analog broadcast channel is modulated and broadcasted according to the National Television Standards Committee (NTSC) standard, the Phase Alternation by Line (PAL) standard, or the SEquential Couleur Avec Memoire (SECAM) standard. In the NTSC standard, the audio signal of the analog broadcast channel is generally FM-standard-modulated and transmitted at a bandwidth of ±25 kHz. In the PAL standard, the audio signal of the analog broadcast channel is standard-modulated and transmitted at a bandwidth of ±50 kHz. The digital broadcast receiver generates and outputs a modulation signal, which causes a magnitude (i.e., an output level) of the audio signal output to a speaker to vary according to a frequency of the modulation signal. If the audio signal of the analog broadcast channel is transmitted at a standard modulation degree and the digital broadcast receiver receives and modulates the audio signal of the analog broadcast channel, there is no difference between the audio signal output of the analog broadcast channel and a corresponding digital broadcast channel that broadcasts the same contents (i.e., for the same station).

A problem lies in the fact that the audio signal of the analog broadcast channel is output using a wide dynamic range of transmission decibels in order to improve a sound quality of a commercial advertisement and an audio output at each broadcast station. The audio signal of the analog broadcast channel is over-modulated for transmission at two to four times a modulation degree of a standard-modulated audio signal. A magnitude of a demodulated audio signal of the analog broadcast channel is determined depending on the modulation degree of a transmitted audio signal. Therefore, the magnitude of the output audio signal of the analog broadcast channel that is over-modulated varies greatly compared to when an audio signal having the same contents is standard-modulated and output over a corresponding digital broadcast channel. Accordingly, since the audio signal output varies between the digital broadcast channel and the corresponding analog broadcast channel, a user is required to control the magnitude of the audio signal (i.e., the output level) whenever the channel is changed which results in an inconvenience to the user.

SUMMARY OF THE INVENTION

The present general inventive concept provides an apparatus and a method of automatically compensating a difference between audio signals of an analog broadcast and a digital broadcast in which a magnitude variation of an output audio signal results from an over-modulation of an analog audio signal.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing an apparatus to automatically compensate audio signals of an analog broadcast and a digital broadcast in a broadcast receiving device to receive a digital broadcast channel and a corresponding analog broadcast channel over which the same contents are broadcasted, the apparatus including an analog demodulating unit to demodulate an analog audio signal of a tuned analog broadcast channel, a digital demodulating unit to demodulate a digital audio signal of a tuned digital broadcast channel, a switching unit to receive the demodulated analog audio signal and the demodulated digital audio signal from the analog demodulating unit and the digital demodulating unit, respectively, and to selectively output one of the received audio signals, an audio amplifying unit to receive the selective output audio signal from the switching unit and to amplify the received audio signal according to a predetermined amplification degree, and a central processing unit to control the switching unit, and to control the audio amplifying unit to amplify the demodulated analog audio signal of the tuned analog broadcast channel according to a first amplification degree when the demodulated analog audio signal is selectively output by the switching unit and to amplify the demodulated digital audio signal of the tuned digital broadcast channel according to a second amplification degree when the demodulated digital audio signal is selectively output by the switching unit such that the amplified analog audio signal has the same output magnitude level as the amplified digital audio signal.

The apparatus may further include a memory to store a table having at least one amplification degree of the audio amplifying unit associated with at least one digital broadcast channel, wherein when the digital audio signal is output from the switching unit, the central processing unit controls the audio amplifying unit to amplify the demodulated digital audio signal at the second amplification degree associated with the digital broadcast channel read from the table.

The second amplification degree may be a multiple of a difference between a modulation degree of the digital audio signal of the digital broadcast channel and a modulation degree of the analog audio signal of the corresponding analog broadcast channel.

If the central processing unit controls the switching unit to output an analog audio signal of a predetermined channel, the central processing unit receives a corresponding modulation degree of the analog audio signal of the predetermined channel from the analog demodulating unit and calculates a difference between the modulation degree of the analog audio signal of the predetermined channel and the digital audio signal from a corresponding digital broadcast channel to update the table.

The apparatus can further include a speaker to receive the audio signal output from the audio amplifying unit to output an audible signal to the user.

If the central processing unit receives a control signal indicating a predetermined magnitude adjustment amount from the user, the central processing unit controls the audio amplifying unit to amplify the digital audio signal at a modified amplification degree obtained by adding the predetermined magnitude adjustment amount to the second amplification degree.

The foregoing and/or other aspects and advantages of the present general inventive concept are also achieved by providing a broadcast receiving device having an auto-compensating apparatus to maintain a constant magnitude of an audio output of an analog broadcast channel and a corresponding digital broadcast channel over which the same contents are broadcasted.

The foregoing and/or other aspects and advantages of the present general inventive concept are also achieved by providing a method of automatically compensating audio signals of an analog broadcast and a digital broadcast in a device to concurrently receive the audio signals of at least one digital broadcast channel and a corresponding analog broadcast channel over which the same contents are broadcasted, the method including tuning to a digital broadcast channel, demodulating and outputting the audio signal of the tuned digital broadcast channel, and amplifying the demodulated audio signal such that a final audio output of the demodulated audio signal has the same magnitude as a final audio output of the corresponding analog broadcast channel.

The method may further include preparing an amplification-degree table including at least one amplification degree associated with at least one digital broadcast channel, wherein the amplifying of the demodulated audio signal comprises reading an amplification degree associated with the tuned digital broadcast channel from the amplification degree table and amplifying the demodulated audio signal accordingly.

The associated amplification degree read from the table is a multiple of a difference between a modulation degree of the audio signal of the tuned digital broadcast channel and a modulation degree of an audio signal of the corresponding analog broadcast channel.

The method may further include tuning to the corresponding analog broadcast channel, demodulating the audio signal of the tuned analog broadcast channel and determining the modulation degree of the analog audio signal, and re-calculating the difference between the modulation degree of the audio signal of the corresponding digital broadcast channel and the modulation degree of the audio signal of the tuned analog broadcast channel to update the amplification degree associated with the corresponding digital broadcast channel in the table.

The method may further include providing the amplified audio signal as an audible signal to a user through a speaker.

The method may further include receiving a control signal indicating a predetermined magnitude adjustment amount from the user, and amplifying the demodulated audio signal at a modified amplification degree obtained by the predetermined adjustment amount to the amplification degree associated with the digital broadcast channel and stored in the table.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 1:
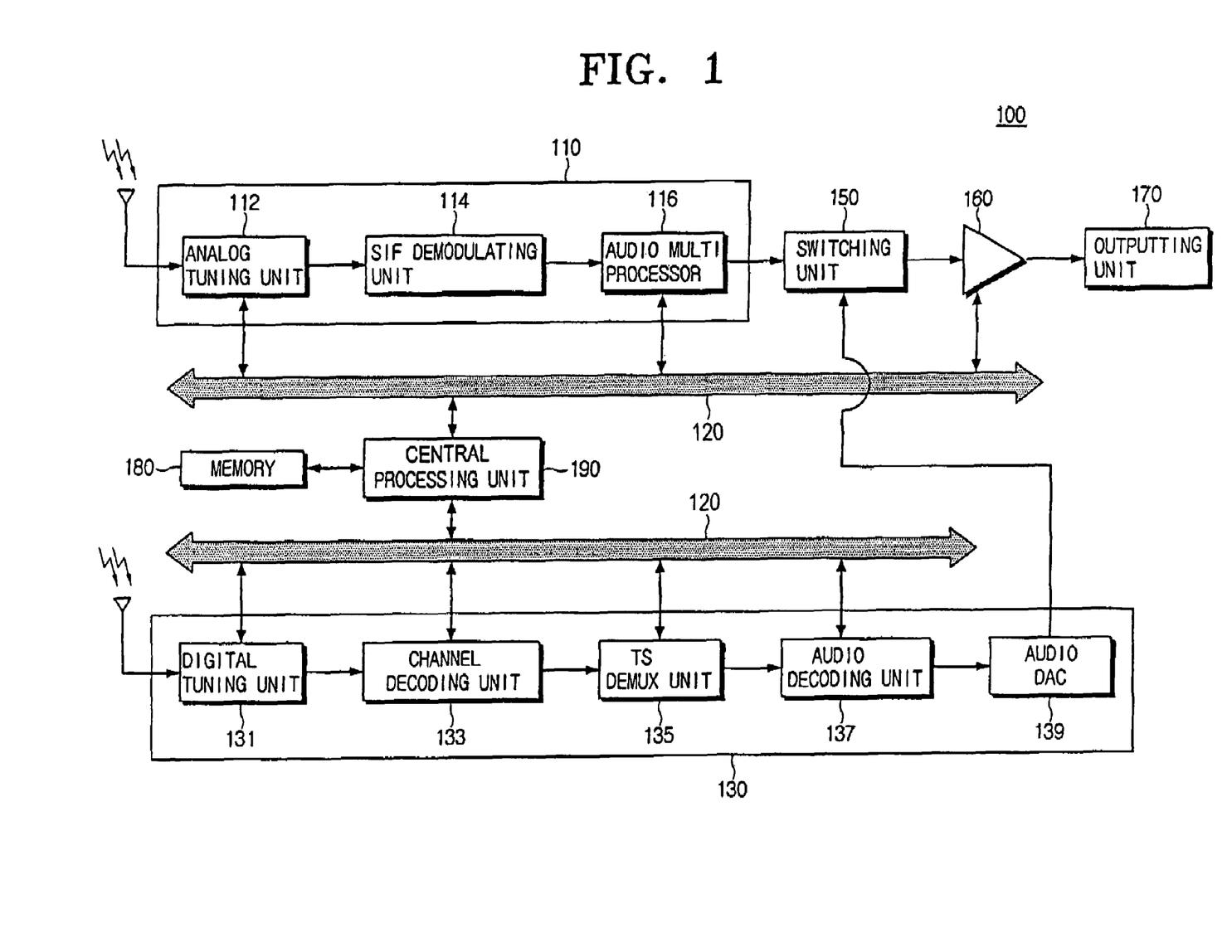
FIG. 1 is a block diagram illustrating an apparatus to automatically compensate a difference between audio signals of an analog broadcast and a digital broadcast according to an embodiment of the present general inventive concept.

FIG. 1 is a block diagram illustrating an apparatus 100 to automatically compensate a difference between audio signals of an analog broadcast and a digital broadcast according to an embodiment of the present general inventive concept.

The auto-compensating apparatus 100 can be included in a digital broadcast receiving device. The digital broadcast receiving device can concurrently receive an analog broadcast channel and a digital broadcast channel. A user can receive an analog broadcast channel and a corresponding digital broadcast channel that broadcast the same contents over different channels. The analog broadcast channel and the corresponding digital broadcast channel may be received from the same broadcast station.

Referring to FIG. 1, the auto-compensating apparatus 100 includes an analog demodulating unit 110, a control signal bus (BUS) 120, a digital demodulating unit 130, a switching unit 150, an audio amplifying unit 160, an outputting unit 170, a memory 180, and a central processing unit 190.

The central processing unit 190 sends control signals to the analog demodulating unit 110, the digital demodulating unit 130, the switching unit 150, and the audio amplifying unit 160 through the BUS 120. The central processing unit 190 can communicate with the different units through the BUS 120 using an I²C protocol, which is a serial communication protocol that synchronizes chips within a circuit board.

The analog demodulating unit 110 demodulates an audio signal of a tuned analog broadcast channel received from among a plurality of wireless broadcast signals. The analog demodulating unit 110 includes an analog tuning unit 112, a Signaling Information Field (SIF) demodulating unit 114, and an audio multi processor 116.

The analog tuning unit 112 receives an analog broadcast signal of the tuned analog broadcast channel from among the plurality of wireless broadcast signals received through an antenna. The analog tuning unit 112 is tuned according to a tuning control signal received from the central processing unit 190.

According to the control of the central processing unit 190, the SIF demodulating unit 114 detects and amplifies an audio intermediate frequency signal, which has one of a 4.5 MHz, a 5.5 MHz, a 6.0 MHz and a 6.5 MHz frequency difference with a video intermediate frequency signal at an output signal of the analog tuning unit 112.

In particular, when the broadcast receiving device operates according to the National Television Systems Committee (NTSC) standard, the SIF demodulating unit 114 detects the audio intermediate frequency signal having the 4.5 MHz frequency difference with respect to the video intermediate signal. When the broadcast receiving device operates according to the Phase Alternation by Line (PAL) standard, the SIF demodulating unit 114 detects the audio intermediate frequency signal having one of the 5.5 MHz, 6.0 MHz and 6.5 MHz frequency difference with respect to the video intermediate signal.

The SIF demodulating unit 114 detects and outputs the audio intermediate frequency and an SIF signal from the received analog broadcast signal.

The audio multi processor 116 detects an audio signal from the audio intermediate frequency signal. The audio multi processor 116 divides the audio signal received from the SIF demodulating unit 114 into two analog channel signals (i.e., a left and right channel) and outputs the two analog channel signals to a stereo. The audio multi processor 116 includes a separate register (not shown) to store a modulation degree of the audio signal received over the tuned analog broadcast channel.

If the audio multi processor 116 detects the audio signal, a magnitude (i.e., an amplitude) of the detected audio signal is determined according to a Frequency Modulation (FM) degree, since the output of the SIF demodulation unit 114 is in a state of FM. As described above, when the NTSC standard is used, the audio signal is FM-standard-modulated into a general ±25 kHz bandwidth for transmission. When the PAL standard is used, the audio signal is standard-modulated into a bandwidth of ±50 kHz for transmission. The magnitude of the detected audio signal of the tuned analog broadcast channel does not have a difference with a magnitude of a detected audio signal of the corresponding digital broadcast channel. However, since the analog broadcast channel is over-modulated and transmitted up to two to four times a standard modulation degree according to a particular need of each broadcast station channel, the magnitude of the output of the audio signal is increased more than when the analog broadcast channel is standard-modulated. Accordingly, a difference between the audio signal of the analog broadcast channel and the corresponding digital broadcast channel occurs.

The digital demodulating unit 130 demodulates the audio signal of a tuned digital broadcast channel from among the plurality of wireless broadcast signals. The digital demodulating unit 130 outputs an audio signal having the same magnitude regardless of the tuned digital broadcast channel. In other words, even though the magnitude of an audio signal output varies among a plurality of analog broadcast channels according to a difference in modulation degree, the magnitude of an audio signal output remains constant among a plurality of digital broadcast channels. The digital demodulating unit 130 of FIG. 1 includes a digital tuning unit 131, a channel decoding unit 133, a Transport Stream (TS) Demux unit 135, an audio decoding unit 137, and an AUDIO signal Digital-to-Analog Converter (AUDIO DAC) 139.

The digital tuning unit 131 receives a digital broadcast signal of the tuned digital broadcast channel from among the plurality of wireless broadcast signals received through an antenna. The digital tuning unit 131 is tuned according to a control signal input from the central processing unit 190. The digital broadcast signal includes a video signal and an audio signal and is converted into an encoded digital signal prior to transmission.

The channel decoding unit 133 decodes the encoded digital signal.

The TS Demux unit 135 separates a Transport Stream (TS) from the decoded digital signal.

The audio decoding unit 137 separates the audio signal of a corresponding digital broadcast channel from the TS.

The AUDIO DAC 139 converts the separated audio signal of the corresponding digital broadcast channel into an analog signal that includes left and right channels. The AUDIO DAC 139 outputs the audio signal to the switching unit 150.

The switching unit 150 outputs the audio signal of a channel selected from among the analog audio signal received from the tuned analog broadcast channel and the digital audio signal received from the tuned digital broadcast channel according to control of the central processing unit 190.

The audio amplifying unit 160 adaptively amplifies the output audio signal received from the switching unit 150 and provides the amplified audio signal to a speaker of an outputting unit 170. An amplification degree of the audio signal is controlled according to an offset value control of the central processing unit 190. The audio amplifying unit 160 is designed to amplify the audio signal according to a default value. The central processing unit 190 controls the amplification degree by controlling the offset value. The central processing unit 190 multiplies the default value by the offset value to control the amplification degree. For example, if the offset value corresponds to two, the amplification degree equals the default value multiplied by two. If the central processing unit 190 receives a magnitude control signal from the user, the central processing unit 190 controls the amplification degree of the audio amplifying unit 160 according to the received magnitude control signal as well as the offset value.

The outputting unit 170 includes the speaker (not shown) to output the amplified audio signal received from the audio amplifying unit 160.

Figure 2:
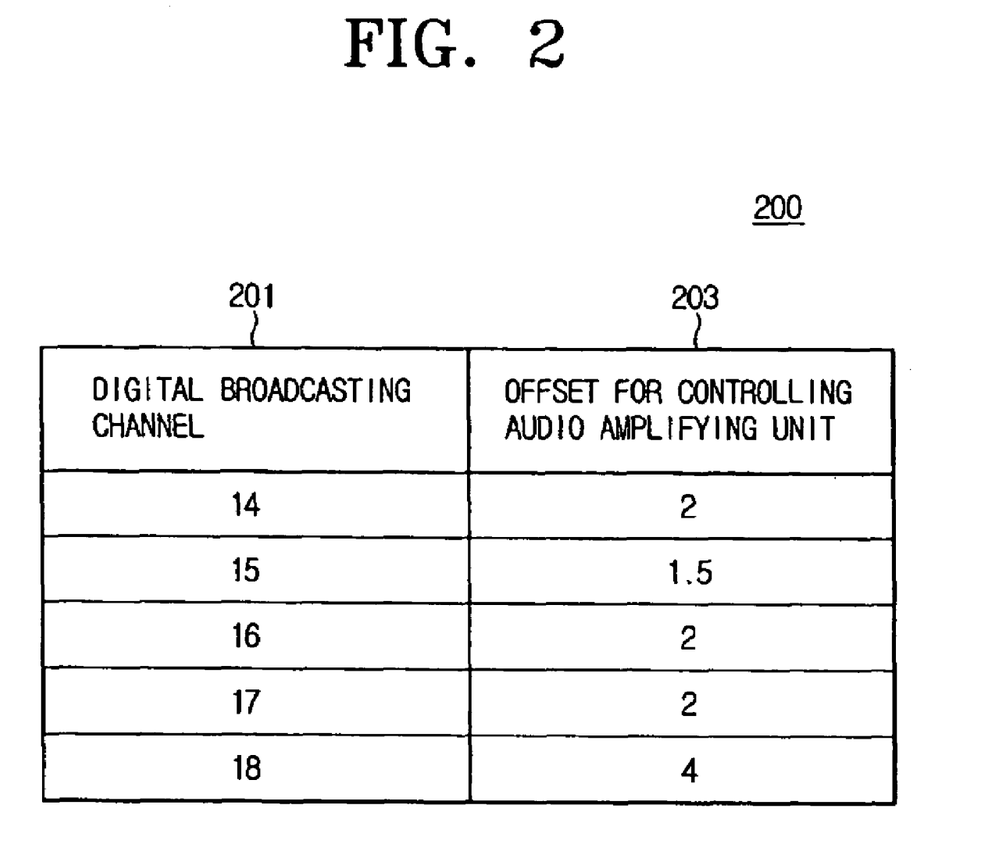
FIG. 2 is a view illustrating an exemplary amplification-degree table having an offset value to control an audio amplifying unit at each of a plurality of digital broadcast channels according to an embodiment of the present general inventive concept.

Memory 180 stores a table 200, illustrated in FIG. 2, having an offset value to control the audio amplifying unit 160 at each of the plurality of digital broadcast channels.

FIG. 2 is a view illustrating an exemplary amplification-degree table 200 having the offset value to control the audio amplifying unit 160 at each of the plurality of digital broadcast channels according to an embodiment of the present general inventive concept.

Referring to FIG. 2, the amplification table 200 includes a plurality of offset values 203 to control the audio amplifying unit 160 at each of the plurality of digital broadcast channels 201.

The central processing unit 190 controls the analog demodulating unit 110 and the digital demodulating unit 130 to receive a channel tuned by the user and to demodulate the audio signal of the corresponding channel. The central processing unit 190 controls the switching unit 150 to output an audio signal of the corresponding channel.

If the digital broadcast channel is tuned, the central processing unit 190 controls the audio amplifying unit 160 to further amplify the audio signal of the tuned digital broadcast channel by a multiple of a modulation-degree difference between the audio signal of the tuned digital broadcast channel and a corresponding analog broadcast channel. As a result, the difference in a magnitude of the digital audio signal that results from the difference in the modulation-degree caused by the over-modulation of the analog broadcast channel is automatically compensated. The central processing unit 190 calculates the difference of the modulation-degree of the digital broadcast channel and the modulation-degree of the corresponding analog broadcast channel. The central processing unit 190 automatically compensates the audio signal of the digital broadcast channel by varying the amplification-degree when the audio signal of the digital broadcast channel is amplified by the audio amplifying unit 160. Furthermore, when the difference in the modulation-degree is calculated, only the modulation degree of the analog audio signal is considered when varying the amplification degree, since the modulation degree of the digital audio signals of the plurality of digital broadcast channels is a constant. The offset value that corresponds to a specific digital broadcast channel is directly proportional to a difference between the modulation degree of the corresponding analog broadcast channel and a standard modulation degree. This is described below with reference to Table 1.

The central processing unit 190 stores the plurality of offset values 203 that correspond to the plurality of digital broadcast channels 201 in the amplification-degree table 200 of the memory 180. A plurality of amplification degrees that correspond to the plurality of digital broadcast channels 201 are determined by multiplying the default value by the corresponding plurality of offset values 203, as described above. The central processing unit 190 reads the modulation degree of the corresponding analog audio signal from the audio multi processor 116 of the analog demodulating unit 110 when the corresponding analog broadcast channel is tuned. The central processing unit 190 calculates a corresponding amplification degree and a corresponding offset value of the corresponding digital broadcast channel from the modulation degree of the read audio signal of the tuned broadcast channel to update the offset value 203 for the corresponding digital broadcast channel 201 in the amplification-degree table 200 stored in the memory 180. When one of the plurality of digital broadcast channels 201 is tuned, the central processing unit 190 reads the offset value 203 for the corresponding digital broadcast channel 201 from the memory 180 to automatically adjust the amplification degree of the audio amplifying unit 160.

If the user inputs a control signal for a magnitude adjustment amount of the audio signal output through the speaker, the central processing unit 190 controls the amplification degree of the audio amplifying unit 160. In this case, if the digital broadcast channel is tuned, the central processing unit 190 can add the magnitude adjustment amount of the control signal to the offset value 203 of the memory 180 to control the amplification degree of the audio amplifying unit 160 with respect to the tuned digital broadcast channel.

Table 1 represents the amplification degree for the digital audio signal depending on the modulation degree of the corresponding analog audio signal.

TABLE 1

| Modulation degree of analog audio signal | Amplification degree of digital audio signal | Offset value to control audio amplifying unit |
| --- | --- | --- |
| 100% | Default | 1 |
| 150% | Default × 1.5 | 1.5 |
| 200% | Default × 2 | 2 |
| 250% | Default × 2.5 | 2.5 |
| 300% | Default × 3 | 3 |
| 350% | Default × 3.5 | 3.5 |
| 400% | Default × 4 | 4 |

The outputting unit 170 processes and power-amplifies the audio signal output from the audio amplifying unit 160 and provides the power-amplified signal to the speaker (not shown).

Figure 3:
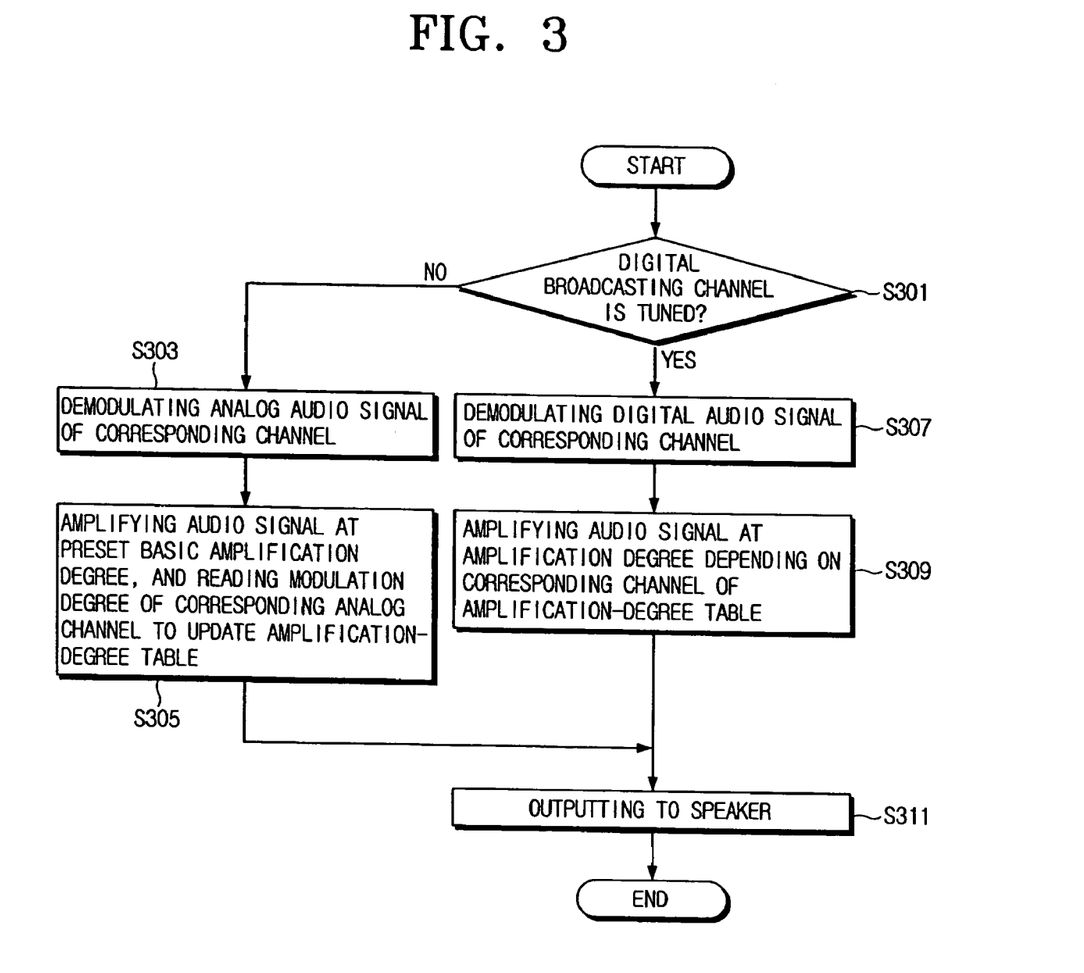
FIG. 3 is a flowchart illustrating a method of automatically compensating a difference between audio signals of an analog broadcast channel and a corresponding digital broadcast channel according to an embodiment of the present general inventive concept.

FIG. 3 is a flowchart illustrating a method of automatically compensating the difference between the audio signals of the analog broadcast and the digital broadcast according to an embodiment of the present general inventive concept.

Hereinafter, the method of automatically compensating the difference between the audio signals of the analog broadcast and the digital broadcast is described with reference to FIGS. 1 to 3.

If the user tunes to an analog broadcast channel at operation S301, the central processing unit 190 activates the analog demodulation unit 110 to demodulate an analog audio signal of the corresponding analog broadcast channel at operation S303.

The central processing unit 190 controls the switching unit 150 to switch to the demodulated analog audio signal, and controls amplification of the demodulated audio signal by the audio amplifying unit 160 using a preset default value as an amplification degree. At the same time, the central processing unit 190 reads a modulation degree of the analog audio signal of the corresponding analog broadcast channel from a register (not shown) of the audio multi processor 116 in order to calculate an offset value for audio amplification of a corresponding digital broadcast channel. Accordingly, the offset value 203 of the amplification-degree table 200 that corresponds to the corresponding digital broadcast channel is then updated and stored in the memory 180. Thus, a difference in magnitude of signal output levels that results from over-modulation of the corresponding analog broadcast channel can be compensated for at operation S305.

If the user tunes to the digital broadcast channel at operation S301, the central processing unit 190 activates the digital demodulating unit 130 to demodulate a digital audio signal of the corresponding digital broadcast channel at operation S307.

The central processing unit 190 controls the switching unit 150 to switch to the demodulated digital audio signal, and reads the offset value 203 of the corresponding digital broadcast channel 201 from the amplification-degree table 200 stored in the memory 180 to control the amplification of the digital audio signal performed by the audio amplifying unit 160. Accordingly, the audio signal of the digital broadcast channel is amplified to the same magnitude as that of the output of the audio signal of the corresponding analog broadcast channel at operation S309.

The audio signals amplified in the operations of S305 and S309 are power-amplified through the speaker of the outputting unit 170 to be audibly output at operation S311.

Through the above process, the output audio signal of the analog broadcast and the digital broadcast are automatically compensated.

As described above, in a digital broadcast receiver to receive a simulcast including a digital broadcast channel and a corresponding analog broadcast channel that broadcast the same contents, a magnitude variation of the output audio signal that results from an over-modulation of the analog audio signal can be automatically compensated. Accordingly, whenever a user changes the channel, the user does not need to control an output level of the audio signal (i.e., the magnitude), thereby providing convenience to the user.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus to automatically compensate audio signals of an analog broadcast and a digital broadcast in a broadcast receiving device to receive a digital broadcast channel and a corresponding analog broadcast channel over which the same contents are broadcasted, the apparatus comprising:
   an analog demodulating unit to demodulate an analog audio signal of a tuned analog broadcast channel;
   a digital demodulating unit to demodulate a digital audio signal of a tuned digital broadcast channel;
   a switching unit to receive the demodulated analog audio signal and the demodulated digital audio signal from the analog demodulating unit and the digital demodulating unit, respectively, and to selectively output one of the received audio signals;
   an audio amplifying unit to receive the selective output audio signal from the switching unit and to amplify the received audio signal according to a predetermined amplification degree; and
   a central processing unit to control the switching unit to selectively output the audio signal of the digital demodulating unit and to control an amplification degree of the audio amplifying unit as the digital broadcast channel is tuned, to allow the amplified audio signal to have the same magnitude as when the corresponding analog broadcast channel is tuned.

2. The apparatus of claim 1, wherein the central processing unit controls the audio amplifying unit to amplify the demodulated analog audio signal of the tuned analog broadcast channel according to a first amplification degree when the demodulated analog audio signal is selectively output by the switching unit and to amplify the demodulated digital audio signal of the tuned digital broadcast channel according to a second amplification degree when the demodulated digital audio signal is selectively output by the switching unit such that the amplified analog audio signal has the same output magnitude level as the amplified digital audio signal.

3. The apparatus of claim 1, wherein the amplification degree used to amplify the digital broadcast channel is a multiple of a difference between a modulation degree of the digital audio signal of the digital broadcast channel and a modulation degree of the analog audio signal of the corresponding analog broadcast channel.

4. The apparatus of claim 1, further comprising:
   a memory to store a table having at least one amplification degree of the audio amplifying unit associated with at least one digital broadcast channel,
   wherein, when the digital audio signal is output from the switching unit, the central processing unit reads an amplification degree associated with the digital broadcast channel from the table and controls the audio amplifying unit to amplify the demodulated digital audio signal at the read amplification degree.

5. The apparatus of claim 4, wherein, if the central processing unit controls the switching unit to output an analog audio signal of a predetermined channel, the central processing unit receives a corresponding modulation degree of the analog audio signal of the predetermined channel from the analog demodulating unit and calculates a difference between the modulation degree of the analog audio signal of the predetermined channel and a digital audio signal from a corresponding digital broadcast channel to update the table.

6. The apparatus of claim 1, further comprising:
   a speaker to receive the audio signal output from the audio amplifying unit to output an audible signal.

7. The apparatus of claim 1, wherein, if the central processing unit receives a control signal indicating a predetermined magnitude adjustment amount, the central processing unit controls the audio amplifying unit to amplify the digital audio signal at a modified amplification degree obtained by adding the predetermined magnitude adjustment amount to the amplification degree used to amplify the digital broadcast channel.

8. An apparatus to compensate for a difference in output levels of audio signals of at least one digital channel and at least one corresponding analog channel that carry the same content, comprising:
   a tuning unit to receive an audio signal from a digital channel;
   a control unit to determine an amplification factor associated with the received digital channel according to a modulation degree of a corresponding analog channel; and
   an amplifying unit to amplify the audio signal of the digital channel according to the determined amplification factor such that amplified audio signals of digital channels and amplified audio signals of corresponding analog channels maintain a constant output level.

9. The apparatus of claim 8, wherein the digital channel and the corresponding analog channel carry the same content.

10. The apparatus of claim 9, wherein the amplification factor is directly proportional to a difference between the modulation degree of the corresponding analog channel and a standard modulation degree of other analog channels.

11. The apparatus of claim 8, wherein the plurality of amplification factors corresponding to the plurality of digital channels are calculated by determining a modulation degree of the corresponding analog channel, determining an offset of the modulation degree from a standard modulation degree, and multiplying the offset of the modulation degree by a default amplification factor.

12. An apparatus to compensate for a difference in output levels of audio signals of at least one digital channel and at least one corresponding analog channel in a simulcast, comprising:
   a switching unit to select an audio signal of one of the at least one digital channel and the at least one corresponding analog channel; and
   an output amplifier to amplify the selected audio signal according to a first amplification factor when the audio signal from the at least one digital channel is selected and to amplify the selected audio signal according to a second amplification factor when the audio signal from the at least one corresponding analog channel is selected,
   wherein the second amplification factor is a default amplification factor and the first amplification factor is a multiple of the default amplification factor.

13. The apparatus of claim 12, wherein the first amplification factor compensates the difference in output levels that results from over-modulation of the at least one corresponding analog channel.

14. An apparatus to compensate for a difference in output levels of audio signals of at least one digital channel and at least one corresponding analog channel in a simulcast, comprising:
a switching unit to select an audio signal of one of the at least one digital channel and the at least one corresponding analog channel;
an output amplifier to amplify the selected audio signal according to a first amplification factor when the audio signal from the at least one digital channel is selected and to amplify the selected audio signal according to a second amplification factor when the audio signal from the at least one corresponding analog channel is selected; and
a control unit to calculate the first amplification factor by determining a modulation degree of the at least one corresponding analog channel, calculating a percentage that the modulation degree of the at least one corresponding analog channel is greater than a standard modulation degree, and setting the second amplification factor as the percentage of a default amplification factor.

15. The apparatus of claim 12, further comprising:
a tuning unit including a digital tuning unit to tune to a digital channel selected from the at least one digital channel and an analog tuning unit to tune to an analog channel selected from the at least one corresponding analog channel; and
a demodulation unit to process a modulated digital audio signal of the tuned digital channel and to process a modulated analog audio signal of the tuned analog channel,
wherein the switching unit switches between the processed analog audio signal and the processed digital audio signal according to a tune control signal received from a user and provides the switched audio signal to the output amplifier.

16. A broadcast receiver, comprising:
an apparatus to compensate for a variation in an output level between a digital channel and a corresponding analog channel, comprising:
a receiver to receive the digital channel and the corresponding analog channel;
an amplifying unit to amplify the digital channel according to an amplification factor that depends on a degree of over modulation of the corresponding analog channel and to amplify the analog channel according to a preset amplification factor; and
a control unit to determine the amplification factor of the digital channel and to control the amplifying unit, accordingly.

17. A method of automatically compensating audio signals of an analog broadcast and a digital broadcast in a device to concurrently receive the audio signals of at least one digital broadcast channel and a corresponding analog broadcast channel over which the same contents are broadcasted, the method comprising:
tuning to a digital broadcast channel;
demodulating and outputting the audio signal of the tuned digital broadcast channel; and
amplifying the demodulated audio signal based on a modulation degree of the corresponding analog broadcast channel such that a final audio output of the demodulated audio signal has the same magnitude as a final audio output of the corresponding analog broadcast channel.

18. The method of claim 17, further comprising:
preparing an amplification-degree table including at least one amplification degree associated with at least one digital broadcast channel,
wherein the amplifying of the demodulated audio signal comprises reading an amplification degree associated with the tuned digital broadcast channel from the amplification degree table and amplifying the demodulated audio signal, accordingly.

19. The method of claim 18, further comprising:
receiving a control signal indicating a predetermined magnitude adjustment amount from a user; and
amplifying the demodulated audio signal at a modified amplification degree obtained by adding the predetermined magnitude adjustment amount to the amplification degree associated with the digital broadcast channel stored in the table.

20. A method of compensating for a difference in output levels of audio signals of at least one digital channel and at least one corresponding analog channel in a simulcast, the method comprising:
selecting an audio signal of one of the at least one digital channel and the at least one corresponding analog channel; and
amplifying the selected audio signal according to a first amplification factor when the audio signal from the at least one digital channel is selected and am in the selected audio signal according to a second amplification factor when the audio signal from the at least one corresponding analog channel is selected,
wherein the second amplification factor is a default amplification factor and the first amplification factor is a multiple of the default amplification factor.

21. The method of claim 20, wherein the first amplification factor is calculated by a difference between a modulation degree of the audio signal from that at least one digital channel and a modulation degree of the audio signal from the at least one corresponding analog channel.

22. The method of claim 20, further comprising:
tuning to a digital channel selected from the at least one digital channel and tuning to an analog channel selected from the at least one corresponding analog channel;
processing a modulated digital audio signal of the tuned digital channel and processing a modulated analog audio signal of the tuned analog channel;
switching between the processed analog audio signal and the processed digital audio signal according to a tune control signal received from a user; and
providing the switched audio signal to the output amplifier.

23. A method of automatically compensating for a difference in output levels of audio signals of at least one digital channel and at least one corresponding analog channel that carry the same content, the method comprising:
receiving an audio signal from a digital channel;
determining an amplification factor associated with the received digital channel according to a modulation degree of a corresponding analog channel; and
amplifying the audio signal of the digital channel according to the determined amplification factor such that amplified audio signals of digital channels and amplified audio signals of corresponding analog channels maintain a constant output level.

24. The method of claim 23, wherein the amplification factor is directly proportional to a difference between the modulation degree of the corresponding analog channel and a standard modulation degree of other analog channels.

25. The method of claim 23, wherein the plurality of amplification factors corresponding to the plurality of digital channels are calculated by determining a modulation degree of the corresponding analog channel, determining an offset of the modulation degree from a standard modulation degree, and multiplying the offset of the modulation degree by a default amplification factor.

* * * * *